(12) United States Patent
Hensel et al.

(10) Patent No.: US 10,441,110 B2
(45) Date of Patent: Oct. 15, 2019

(54) TOASTER WITH SUPPLEMENTAL CYCLE

(75) Inventors: Keith James Hensel, Lane Cove (AU);
Richard Hoare, Lane Cove (AU)

(73) Assignee: BREVILLE PTY LIMITED,
Alexandria, New South Wales (AU)

( * ) Notice: Subject to any disclaimer, the term of this patent is extended or adjusted under 35 U.S.C. 154(b) by 2103 days.

(21) Appl. No.: 12/119,445

(22) Filed: May 12, 2008

(65) Prior Publication Data

US 2008/0203085 A1 Aug. 28, 2008

(51) Int. Cl.
*A47J 37/08* (2006.01)

(52) U.S. Cl.
CPC ....... *A47J 37/0835* (2013.01); *A47J 37/0842* (2013.01)

(58) Field of Classification Search
USPC ........ 219/386–392, 490–492, 497, 494, 518, 219/519; 99/324–327, 329 RT, 329 P, 99/386
See application file for complete search history.

(56) References Cited

U.S. PATENT DOCUMENTS

| | | | |
|---|---|---|---|
| 3,599,312 A * | 8/1971 | Hitzeroth ............ | A47J 37/0814 99/327 |
| 4,345,145 A * | 8/1982 | Norwood .................. | 219/492 |
| 4,346,651 A * | 8/1982 | Schickedanz .............. | 99/392 |
| 4,518,849 A * | 5/1985 | Rolland ............... | A47J 37/0842 219/492 |
| 5,128,521 A * | 7/1992 | Lanno et al. ............... | 219/518 |
| 5,193,439 A * | 3/1993 | Finesman ............ | A47J 37/0842 219/492 |
| 5,402,708 A * | 4/1995 | Krasznai et al. ............ | 99/328 |
| 5,414,243 A * | 5/1995 | Snell et al. ................ | 219/492 |
| 5,672,288 A * | 9/1997 | Tran .................. | 219/502 |
| 5,705,791 A * | 1/1998 | Sutton ................ | A47J 37/0842 219/492 |
| 5,802,957 A * | 9/1998 | Wanat ................ | A47J 37/0842 219/492 |
| 5,844,207 A * | 12/1998 | Allard et al. ............ | 219/497 |
| 6,123,012 A * | 9/2000 | Hardin et al. ............ | 99/326 |
| 6,140,621 A * | 10/2000 | Ho et al. .................. | 219/494 |
| 6,198,078 B1 * | 3/2001 | Wanat et al. ............ | 219/492 |
| 6,217,924 B1 * | 4/2001 | Sit et al. ................. | 426/233 |
| 6,311,608 B1 * | 11/2001 | Hardin ................ | A47J 37/0842 219/492 |
| 6,357,343 B1 * | 3/2002 | Tomsich ............... | A47J 37/08 99/329 RT |
| 6,543,337 B1 * | 4/2003 | Brown ................... | 99/327 |
| 6,753,510 B2 * | 6/2004 | Lile ................... | A47J 37/0842 219/398 |

(Continued)

FOREIGN PATENT DOCUMENTS

WO WO-90/07899 A1 7/1990

OTHER PUBLICATIONS

First Examination Report for Australian Patent Application No. 2014100329, dated Jun. 6, 2014.

(Continued)

*Primary Examiner* — Ibrahime A Abaham
*Assistant Examiner* — Frederick F Calvetti
(74) *Attorney, Agent, or Firm* — Marshall, Gerstein & Borun LLP

(57) ABSTRACT

A toaster has a user selectable supplementary toasting cycle that is intended to change the shade of a food after or during a toasting cycle.

17 Claims, 1 Drawing Sheet

(56) References Cited

U.S. PATENT DOCUMENTS

| | | |
|---|---|---|
| 6,946,630 B2* | 9/2005 | Lee et al. ............... 219/680 |
| 7,067,777 B2* | 6/2006 | Lee et al. ............... 219/680 |
| 7,132,633 B2* | 11/2006 | Lee et al. ............... 219/680 |
| 7,164,106 B2* | 1/2007 | Yu et al. ................ 219/685 |
| 7,268,328 B2* | 9/2007 | Lee et al. ............... 219/680 |
| 7,351,939 B2* | 4/2008 | Boyle et al. ............ 219/521 |
| 7,481,153 B2* | 1/2009 | Barnes et al. ............ 99/326 |
| 7,619,186 B2* | 11/2009 | Cavada et al. .......... 219/506 |
| 2003/0042248 A1* | 3/2003 | Witt et al. .............. 219/497 |
| 2003/0116557 A1* | 6/2003 | Graff ..................... 219/492 |
| 2003/0197002 A1* | 10/2003 | Lile et al. .............. 219/492 |
| 2005/0204927 A1* | 9/2005 | Boyle et al. ............. 99/389 |
| 2006/0162573 A1* | 7/2006 | Yip ...................... 99/389 |
| 2007/0221668 A1* | 9/2007 | Baarman et al. ........ 219/746 |
| 2010/0006561 A1* | 1/2010 | Hensel et al. ........... 219/483 |

OTHER PUBLICATIONS

Second Examination Report for Australian Patent Application No. 2014100329, dated Aug. 28, 2014.

* cited by examiner

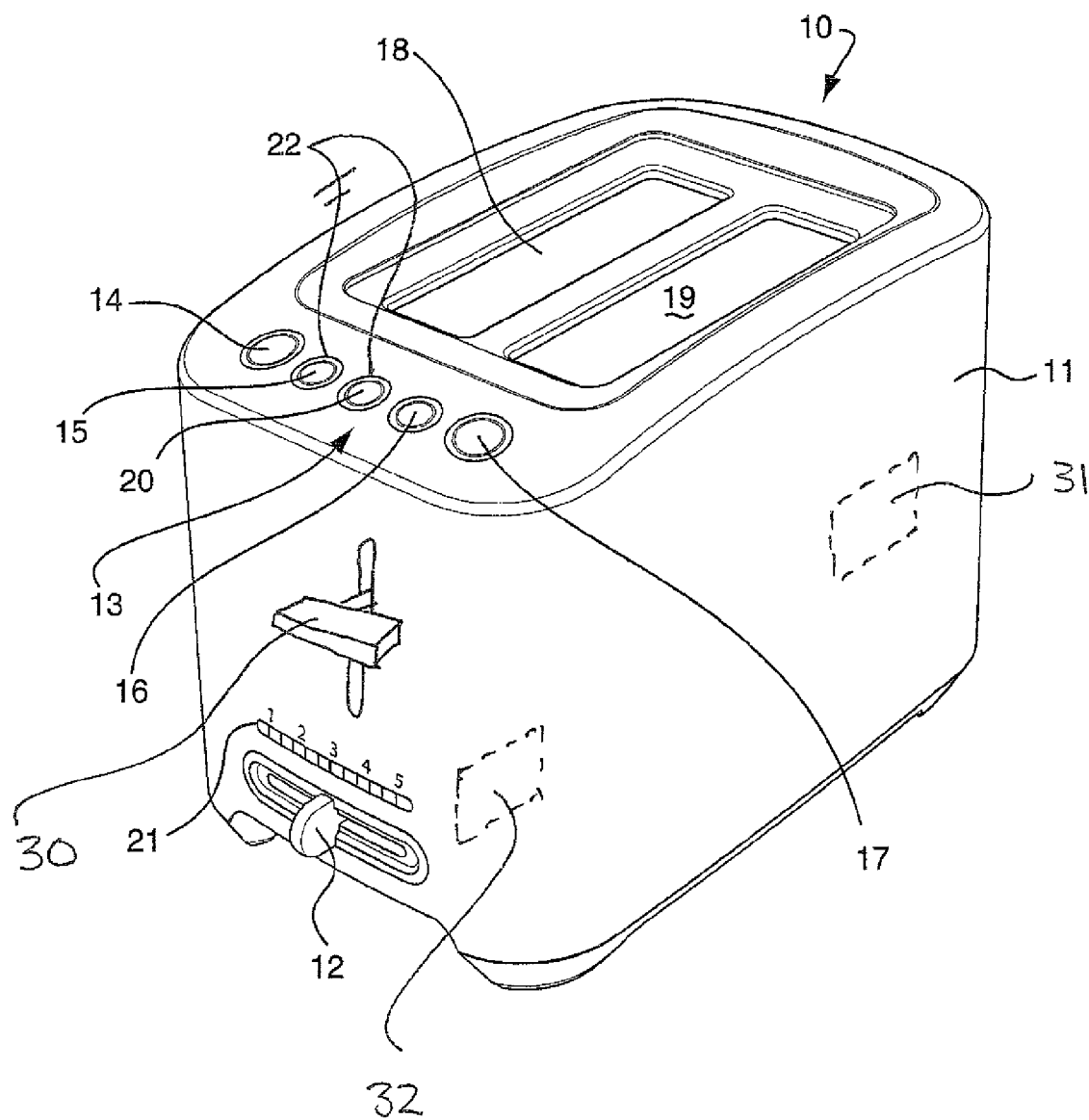

TOASTER WITH SUPPLEMENTAL CYCLE

FIELD OF THE INVENTION

The invention pertains to toasters and more particularly to a toaster having a supplemental toasting cycle.

BACKGROUND OF THE INVENTION

For the purpose of this specification, it will be understood that a wide variety of foods may be cooked in a toaster. Such foods include breads such as wholemeal breads, bagels, pastries, conventional sliced breads as well as frozen versions of all of the aforesaid examples. Throughout the specification, the term "food" will be used to designate all of these unless otherwise specified. Use will also be made of the term "toasting cycle". A toasting cycle is a process that begins with the presence of food in the toasting cavity and ends with the extinguishing of the heating elements and ejection of the food in those toasters that act to eject the food (some toasters do not eject the food). The term "toasting cycle" may also refer to defrosting. The use of the term "toasting cycle" is made without reference to the initial temperature of the toaster or the toasting cavity. The phrase "supplemental cycle" refers to both the lengthening of a toasting cycle or a second new cycle that supplements a first or initial cycle.

Reference will be made throughout the specification to the word "shade". For the purpose of the examples provided in the specification, the range of toasting times is divided into five "shades". The lowest degree of toasting or browning is referred to as "shade 1". The longest duration toasting and thus the most brown is designated as "shade 5". The display of a toaster may only indicate, say, five basic intended shades, but additional shades for a given food may be available when a user positions a sliding adjustment lever, mechanism or adjustment knob to a position between any two of the five basic shades.

It will be appreciated that the teachings of the present invention, apart from the specific methods of electromechanically implementing them are equally applicable to both manual and motorised toasters.

It is sometimes the case that a toasting cycle results in a toasted food that is, to the taste of the user, undercooked. In such circumstances, a user will typically leave the food in the toaster, initiate another toasting cycle and then manually interrupt that cycle in order that the food not be burnt. However, if the user forgets or becomes distracted the already toasted food will go through a second full cycle and may burn.

Toasters are known to have a reheat cycle. The purpose of a reheat cycle is to bring food that has gone cold in the toaster to a temperature approximating the temperature that is normally achieved at the end of a normal toasting cycle. The purpose of a reheat cycle is to increase the temperature of the food but not to change the shade or amounts of brownness on the surface of the food. It is also known to provide a toaster with a timer that measures the amount of time since the completion of a full toasting cycle. A subsequent toasting cycle may be shortened in accordance with that measurement to account for heat in the cavity when the cycle starts.

OBJECTS AND SUMMARY OF THE INVENTION

It is an object of the invention to provide a toaster with a supplementary toasting cycle that is intended to change the shade of a food after or during a toasting cycle.

BRIEF DESCRIPTION OF THE DRAWING FIGURES

In order that the invention be better understood, reference is now made to the following drawing figures in which:

FIG. 1 is a perspective view of a toaster.

BEST MODE AND OTHER EMBODIMENTS

Introduction

As shown in FIG. 1 a toaster 10 comprises a cover 11 below which is located a chassis having moveable toast racks. The exterior of the toaster features a toast cycle selection slider (or knob or mechanism) 12 and control buttons 13, switches, mechanisms etc. In a motorised toaster a typical layout of control buttons might optionally include an "on" button 14 for initiating or terminating cycle, and one or more "special food" buttons 15, 16 for specifying special cycles such as a bagel cycle or crumpet cycle or the like, an optional "defrost" button 16 for specifying a defrost cycle and an "inspection" button 17 for initiating a mid-cycle visual inspection. The "defrost" button 16 is considered a "special food" button. The toaster further includes one or more cooking slots is, the slots leading to an internal toasting cavity 19. A manual toaster may have an activation handle 30 for lowering the food and initiating the processor 31 that activates and times the operation of the heating elements. A motorised or automatic toaster will conventionally not have a handle. Instead it has an "on" button 14 that sends the appropriate switching signals to the processor 31. The processor 31 in such a slotted toaster controls the heating elements and the toasters motor 32. The motor drives the slotted toaster's food racks. It will be appreciated that the teachings of the invention may be applied to electric toaster ovens for food as well as toasters with slots. Both are referred to as "food toasters" or "toasters".

A bagel cycle is one in which only the elements between adjacent slots are activated. A user will normally be instructed to use specific adjacent slots for toasting a bagel, with the cut faces of the bagel facing one another in the adjacent slots.

The mid-cycle inspection button 17 causes the toaster's motor to elevate the racks that carry the food without interrupting the operation of the heating elements. The food emerges from the slots 18 so that the user can inspect it, the food being lowered by the motor back into the toasting cavity without undue delay. Use of the mid-cycle inspection button 17 does not affect the duration of the cycle. In some manual toasters, mid-cycle inspection can be achieved by lifting the handle 30 during a cycle.

A mid-cycle inspection can be performed in some manual toasters by simply lifting the toaster's lowered activation lever 30, mid-cycle, to elevate the partially toasted food and then allowing the lever to return to its lowered position. Use of the mid-cycle inspection in a manual toaster does not affect the duration of the cycle.

In the present invention, a food toaster is also provided with a "supplemental cycle" or "A Bit More™" button or switch or activator 20 that operates in two ways. If the button or activator 20 is depressed during a toasting cycle, it will lengthen the cycle, as will be explained. If the button 20 is pressed after the termination of a toasting cycle, a new cycle or after-cycle will be initiated and carried out, as will be explained.

A toaster's display area 21 may feature an array of indicators such as LED lights that may be used for a variety of purposes. The term "array" is intended to include linear or other abstract graphical arrays or alpha numeric arrays. The array may be used to provide a visual feedback of the initial toast cycle setting, more lights or different alphanumeric characters in the array being illuminated to indicate a higher setting. The array 21 may also be used as the display of a countdown timer, the lights flashing or otherwise changing while a cycle is in progress and being extinguished or altered (e.g. alphanumerically), in an orderly way, to indicate the amount of time remaining in the cycle. In other embodiments, the array 21 can be used mid-cycle to indicate that an adjustment to the cycle time has been requested by the user. In a count down mode, the appearance of additional lights or different alphanumeric characters indicates (that owing to one of a variety of schemes) additional time has been requested by the user.

Various embodiments illustrating the use of a supplemental cycle will now be exemplified.

1. Fixed Supplement

In the most basic embodiments of the invention, depression of the supplement button 20 results in the delivery of a toasted food that is approximately one half shade darker than the shade originally requested a) Manual Toaster In a manual toaster, and in the most basic form of the invention, activation of the supplemental heat button or activator 20 can have two results. If the button or activator 20 is activated during a toasting cycle, a fixed amount of time is added to the duration of the cycle in progress, regardless of what shade the user had initially requested. For example, activation of the button 20 during the toasting cycle might add 20 seconds to the duration of the cycle. Where the supplemental heat button 20 is depressed after the completion of a toasting cycle, a supplemental toasting cycle will be initiated after the user depresses the activation lever of the toaster. This supplemental cycle is shorter than the initial or first requested cycle but calculated to darken the food already in the toaster. In this example, if twenty seconds is added during a mid-cycle supplement, then operation of the supplemental heat button 20 after that initial toasting cycle might result in a forty second supplemental cycle being initiated the next time the activation lever is depressed. Less time is required mid-cycle because the toaster is already hot. If the supplemental heat button 20 were depressed again before the activation lever were operated, the supplemental heat function would be cancelled and the user would be initiating a new normal cycle rather than a supplemental cycle on the next use.

Use of the supplemental cycle button or activator 20 causes an indicator to be illuminated by the processor. The indicator may be an annular light 22 surrounding the activator 20 or an illuminated indication (graphical or alphanumeric) provided by the array 21. The indicator is not extinguished by the processor until the supplemental cycle is completed or the activator 20 is again depressed by the user to cancel the supplemental cycle or the request for same.

b) Motorised Toaster

In a motorised toaster, activation of the supplemental heat button or activator 20 during a toasting cycle can be similarly used to add a fixed amount of time to a given toasting cycle. Activation of the supplemental heat button or activator 20 after the completion of a toasting cycle causes the food to descend once again into the toasting cavity 19 under the influence of the toaster's motor 32. This can happen as soon as the button 20 is depressed or may require the depression, in turn, of both the supplemental heat button 20 and the activation or "on" button 14. The supplemental heat cycle thus initiated will last a fixed amount of time regardless of the previous toast cycle setting. The LED indicator 21 may be used to display the progress of the initial as well as the supplemental toasting cycles.

In a motorised toaster, use of the supplemental cycle button or activator 20 causes an indicator to be illuminated by the processor. The indicator may be an annular light 22 surrounding the activator 20 or an illuminated indication (graphical or alphanumeric) provided by the array 21. The indicator is not extinguished by the processor until the supplemental cycle is completed or the activator 20 is again depressed by the user to cancel the supplemental cycle or the request for same.

2. Fixed Supplement with Adjustment

In either a manual or a motorised toaster, use of the supplemental heat button 20 can be augmented by giving the user additional control over the duration of the supplemental cycle. This can be done by having the toaster's microprocessor recognise an input from the toast cycle selection lever or knob or mechanism 12 as a modification to a heat supplement. For example, a mid-cycle extension of twenty seconds, initiated by the use of the heat supplement button 20, can be varied by, say, ten seconds either way by using the toast selection lever or knob 12 after the supplemental heat button 20 has been pressed. This may be accompanied by a visual display on the LED array 21 that is representative of the adjustment requested by the user. The toast cycle selection lever 12 can also be used as an adjustment to an after-cycle or a "new" supplemental cycle by adjusting the toast cycle selection lever of knob 12 after an initial toasting cycle has been completed and after the supplemental heat button 20 has been depressed.

Again, use of the supplemental cycle button or activator 20 causes an indicator to be illuminated by the processor. The indicator may be an annular light 22 surrounding the activator 20 or an illuminated indication (graphical or alphanumeric) provided by the array 21. The indicator is not extinguished by the processor until the supplemental cycle is completed or the activator 20 is again depressed by the user to cancel the supplemental cycle or the request for same.

It will be appreciated that the increase in the duration of a cycle referred to above can be a fixed duration regardless of the initial toast cycle selection setting, or can be initially fixed, then modified by user input. It should also be appreciated that the extent of the fixed increase (either mid-cycle or after-cycle) can be different depending on the food in the toaster and whether or not it is frozen, for example, whereas a fixed mid-cycle extension of time may be twenty seconds, it might be fifteen seconds if the bagel button had been depressed or thirty seconds if the defrost button 16 had been depressed. Thus, the use of the supplemental heat button 20 can result in different fixed extensions of toasting time being applied, in different circumstances (mid-cycle or after-cycle) and result in different times being applied depending upon the toasting regime (normal, bagel or defrost).

3. Algorithmic Supplement

Examples have been provided in section 1 (above) that show how a fixed period extension of time can be applied during or after a normal toasting cycle. In alternate embodiments, rather than apply a fixed interval, the mid-cycle extension, new or after-cycle supplemental cycle is determined by an algorithm related to the initial toast cycle selection setting and optionally other input factors as well. Input factors that the algorithm may consider include e.g. the type of food in the toaster, the shade setting, the actual or inferred temperature in the toasting cavity, whether frozen food is in the toaster etc. For example, a user may have set the toast cycle selection lever or knob 12 to shade 3 and determined, by using the mid-cycle inspection feature 17 that the bagel was, to their liking, under toasted. Subsequent depression of the supplemental heat button 20, in this example, causes the toaster's microprocessor to run an algorithm that determines that the normal duration of 156 seconds should be extended by e.g. 20%. This results in the microprocessor adding 31 seconds to the cycle time, thus resulting in a total cycle time of 186 seconds. Similarly a new or after-cycle supplemental cycle can be adjusted in its duration by a time period determined by an algorithm that takes into account one or more input factors.

In accordance with the above teachings, an increase can also be modified by the user by adjustment of the toast cycle selection lever 12, in the way indicated above. The user modification to the supplemental heating period can be done by adding a fixed time, a fixed percentage or a situation dependent variable period to the supplemental time.

4. Adjustment of Supplemental Heating Based on Delay

With reference only to the use of the supplemental heating button 20 as a means of initiating a new and supplemental toasting cycle (in either a manual or motorised toaster) adjustment of the supplemental cycle duration (based on any of the above methods) can be made by taking into account the delays since the last time the heating elements of the toaster were switched off. The toaster's microprocessor can determine the time interval since the elements were last switched off. This interval in time can be interpreted as an indication of the toaster's internal temperature. When the interval is short, the toaster will be hotter than when the interval is long. Thus, the supplemental cycle can be adjusted to account for the extrapolated (or directly measured) internal temperature of the toaster. The cycle will be shortened when the aforementioned delay is shorter and may be lengthened when the delay is longer.

While the present invention has been disclosed with reference to particular details of construction, these should be understood as having been provided by way of example and not as limitations to the scope or spirit of the invention. It will also be appreciated that various features of the several embodiments may be combined, as required, desired or dictated by common sense and ordinary skill in this art.

What is claimed is:

1. A toaster for a food, comprising:
heating elements and an activation handle for lowering the food and activating the heating elements, the toaster having a toasting cycle with a completion defined by an extinguishing of the heating elements, and having a user control for selecting a shade, and a processor that has control over the heating elements, the toaster further comprising:
a supplemental cycle activator operatively coupled to the processor, wherein the supplemental cycle activator when activated by a user after the completion of an initial toasting cycle of the food at an initially specified shade, communicates with the processor and causes, when the activation handle is next depressed, a supplemental cycle of a duration determined by the processor that is less than a duration of the initial toasting cycle;
the supplemental cycle providing to said food, a shade that corresponds to approximately one half shade darker than the initially specified shade.

2. The food toaster of claim 1, wherein:
the supplemental cycle activator is a switch that is separate to the user control.

3. The toaster of claim 1, wherein:
use of the activator to initiate a supplemental cycle causes the processor to illuminate an indicator that is not extinguished by the processor until the supplemental cycle is complete.

4. The toaster of claim 1, wherein:
use of the activator to initiate a supplemental cycle causes the processor to illuminate an indicator that is not extinguished by the processor until the supplemental cycle activator is used again by the user to cancel the supplemental cycle.

5. The toaster of claim 1, wherein:
the processor recognizes a user input from a user operated control on the toaster, as an instruction to modify a duration of the supplemental cycle according to the input.

6. The toaster of claim 5, wherein:
the toaster further comprises an illuminated display having an array of segments, and wherein the processor is adapted to cause a visual display on the array that is representative of the duration.

7. The toaster of claim 1, wherein:
the duration determined by the processor is based on whether or not a special cycle had also been user selected in the initial toasting cycle.

8. The toaster of claim 1, wherein:
the duration of the supplementing is calculated by the processor, by taking into account an internal temperature of the toaster.

9. A toaster for a food, comprising:
heating elements, motorized racks for raising and lowering the food, a toasting cycle with a completion defined by an extinguishing of the heating elements, a user control for selecting a shade, and a processor that has, in response to user inputs, control over the motorized racks and heating elements, the toaster further comprising:
a supplemental cycle activator operatively coupled to the processor, wherein the supplemental cycle activator when activated by a user after the completion of an initial toasting cycle of the food at an initially specified shade, communicates with the processor and causes, when the motorized racks are next lowered, a supplemental cycle of a duration determined by the processor that is less than a duration of the initial toasting cycle;
the supplemental cycle providing to said food, a shade that corresponds to approximately one half shade darker than the initially specified shade.

10. The food toaster of claim 9, wherein:

the supplemental cycle activator is a switch that is separate to the user control.

11. The toaster of claim 9, wherein:
use of the activator to initiate a supplemental cycle causes the processor to illuminate an indicator that is not extinguished by the processor until the supplemental cycle is complete.

12. The toaster of claim 9, wherein:
use of the activator to initiate a supplemental cycle causes the processor to illuminate an indicator that is not extinguished by the processor until the supplemental cycle activator is used again by the user to cancel the supplemental cycle.

13. The toaster of claim 9, wherein:
the processor recognizes a user input from a user operated control on the toaster, as an instruction to modify a duration of the supplemental cycle according to the input.

14. The toaster of claim 9, wherein:
the toaster further comprises an illuminated display having an array of segments, and the processor is adapted to cause a visual display on the array that is representative of both the initially specified shade and the user input.

15. The toaster of claim 9, wherein:
the duration determined by the processor is based on whether or not a special cycle had also been user selected in the initial toasting cycle.

16. The toaster of claim 9, wherein:
the duration of the supplementing is calculated by the processor, by taking into account an internal temperature of the toaster.

17. The toaster of claim 9, wherein:
a user activation of the supplemental cycle activator causes the processor to lower the motorized racks.

* * * * *